United States Patent [19]
Greenwood

[11] 3,797,979
[45] Mar. 19, 1974

[54] SEGMENTED TIRE MOLD APPARATUS
[75] Inventor: Alan Greenwood, Kent, Ohio
[73] Assignee: The Goodyear Tire & Rubber Company, Akron, Ohio
[22] Filed: Mar. 14, 1972
[21] Appl. No.: 234,566

Related U.S. Application Data
[63] Continuation-in-part of Ser. No. 148,670, June 1, 1971, abandoned.

[52] U.S. Cl. ............... 425/47, 425/46, 425/DIG. 5, 425/450
[51] Int. Cl. ............................................. B29h 5/02
[58] Field of Search ............ 425/29, 36, 38, 43, 46, 425/47, 37, DIG. 5

[56] References Cited
UNITED STATES PATENTS

| 3,553,789 | 1/1971 | Allitt | 425/36 |
| 3,609,819 | 10/1971 | Searle | 425/47 |
| 1,132,250 | 3/1915 | Finlayson | 425/38 |
| 3,276,930 | 10/1966 | Keefe | 425/43 X |
| 3,460,197 | 8/1969 | Cantarutti | 425/46 |
| 3,461,502 | 8/1969 | Turk et al. | 425/29 |
| 3,464,090 | 9/1969 | Cantarutti | 425/46 X |
| 3,543,338 | 12/1970 | Cooper | 425/DIG. 5 |
| 3,682,576 | 8/1972 | Gross | 425/46 |

FOREIGN PATENTS OR APPLICATIONS

| 975,644 | 11/1964 | Great Britain | 425/46 |
| 1,039,049 | 8/1966 | Great Britain | 425/37 |

Primary Examiner—J. Howard Flint, Jr.
Attorney, Agent, or Firm—F. W. Brunner; R. S. Washburn

[57] ABSTRACT

Apparatus for molding tires providing means for actuating a segmented mold having two annular sidewall molds and a plurality of tread mold segments readily installed, removed, and interchanged therein. The segments are moved radially inwardly by a closing mechanism associated with or attached to a first part of the apparatus which carries one sidewall mold and a second mechanism, independent of the closing mechanism, for moving the respective tread molding segments to be moved further outwardly while permitting the segments to be moved further outwardly without limit. The latter mechanism is illustrated by a cam ring mounted for partial rotation or oscillation about the mold axis and which has a plurality of cam ramps which engage cam followers mounted respectively on the tread mold segments and disposed outwardly of the cam ring.

25 Claims, 13 Drawing Figures

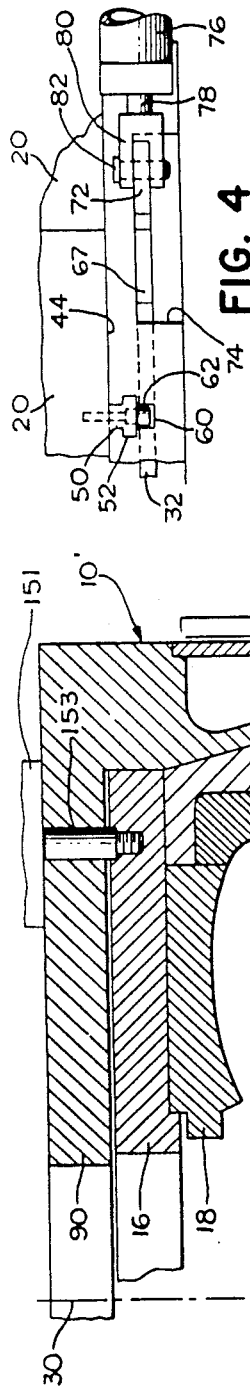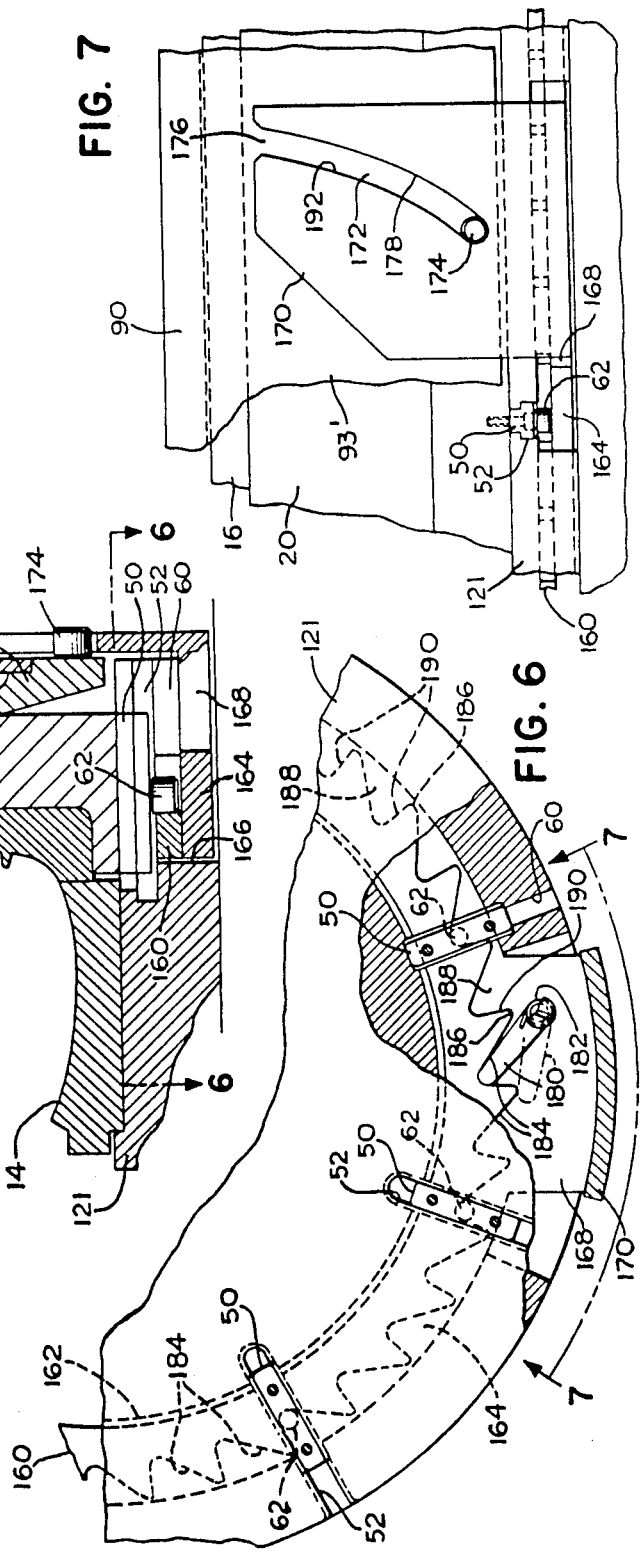

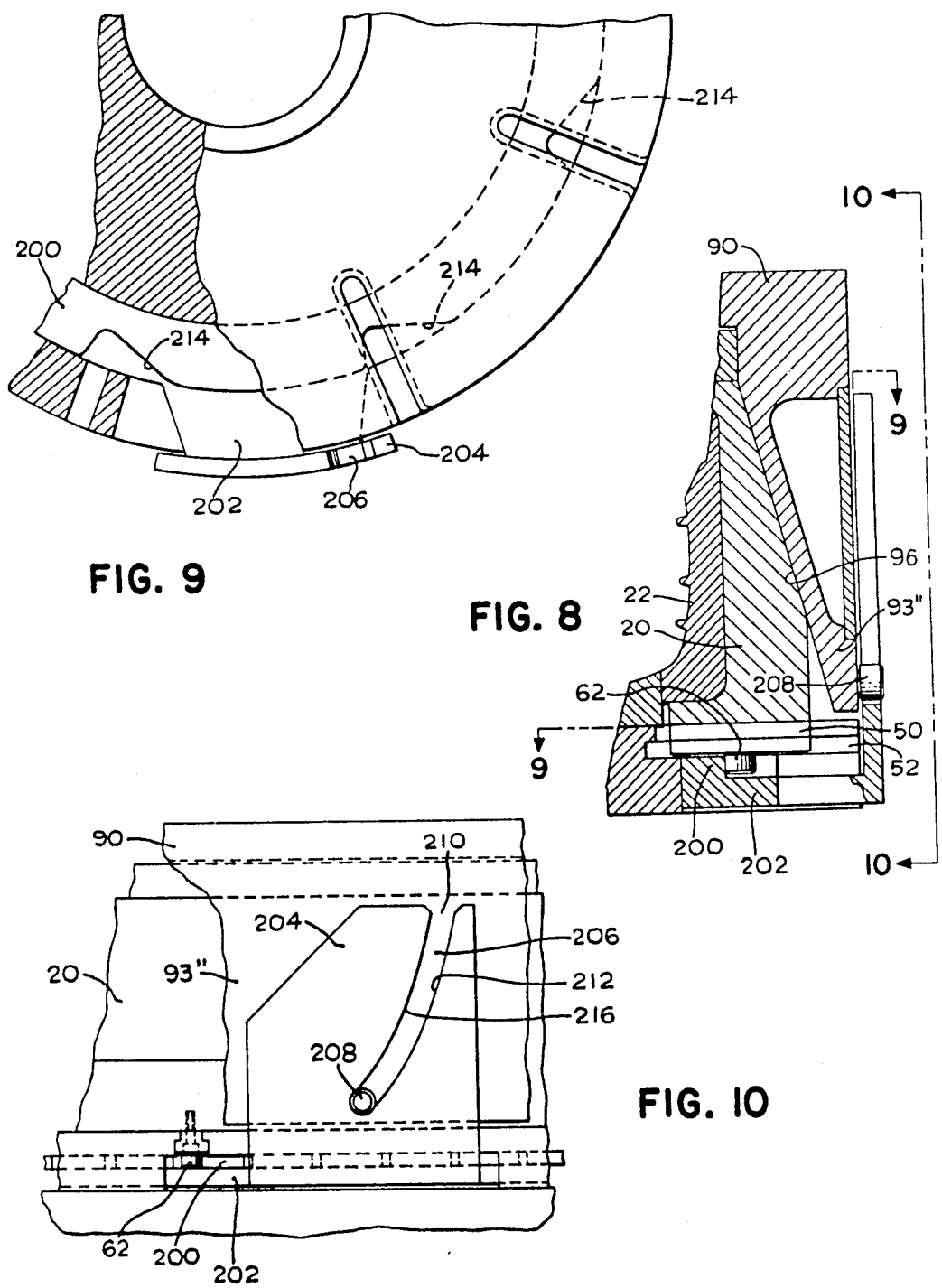

3,797,979

SEGMENTED TIRE MOLD APPARATUS

This application is a continuation-in-part of application Ser. No. 148,670, filed June 1, 1971, and now abandoned.

The foregoing abstract is not to be taken as limiting the invention of this application, and in order to understand the full nature and extent of the technical disclosure of this application, reference must be made to the accompanying drawing and the following detailed description.

The invention relates to apparatus for molding a tire and particularly to apparatus of the type commonly referred to as a segmented mold.

A primary object of the invention is to provide a tire mold of the segmented mold type in which the parts of the mold itself which form a tire molding cavity can be manufactured at less cost and can readily be installed, removed, and interchanged in the apparatus.

A further object of the invention is to provide a tire mold apparatus of the segmented mold type in which the respective tread molding segments remain associated with the one mold sidewall when the press is opened and which segments are moved radially outwardly to open the mold by a mechanism independent of the mechanism associated with the other mold sidewall for moving the respective tread molding segments radially inwardly to close the mold and from which apparatus the segments can be freely removed.

The foregoing objects and other objects and advantages which will be particularly pointed out or will become apparent from the following description are accomplished by the provision of a tire mold comprising means for mounting a first annular mold sidewall, means for mounting a second annular sidewall for movement relatively of the first mold sidewall, a plurality of tread mold mounting means for mounting tread molding segments in collectively cooperable relation with the first and second mold sidewalls to form a tire molding cavity and with the tread segments being supported for radial movement relative to the first sidewall, and means operable to move each tread mold mounting means radially outwardly of the first said means and to permit both further movement radially outwardly and movement radially inwardly of the tread mold mounting means.

In the description which follows of a particular illustrative embodiment of the invention, reference is made to the attached drawings in which:

FIG. 4 is a partial elevation view, taken as indicated by lines 4—4 in FIG. 3;

FIG. 5 is a partial elevation in section illustrating a further embodiment of the invention;

FIG. 6 is a partial plan view, oriented as indicated by the line 6—6 in FIG. 5, with parts removed and other parts broken away;

FIG. 7 is a partial elevation view, oriented as indicated by the lines 7—7 in FIG. 6;

FIG. 8 is a partial elevation in section illustrating an additional embodiment of the invention;

FIG. 9 is a partial plan view, oriented as indicated by the lines 9—9 in FIG. 8, with portions removed and partly broken away;

FIG. 10 is a partial elevation view, oriented as indicated by the lines 10—10 in FIG. 8;

Figure 1:
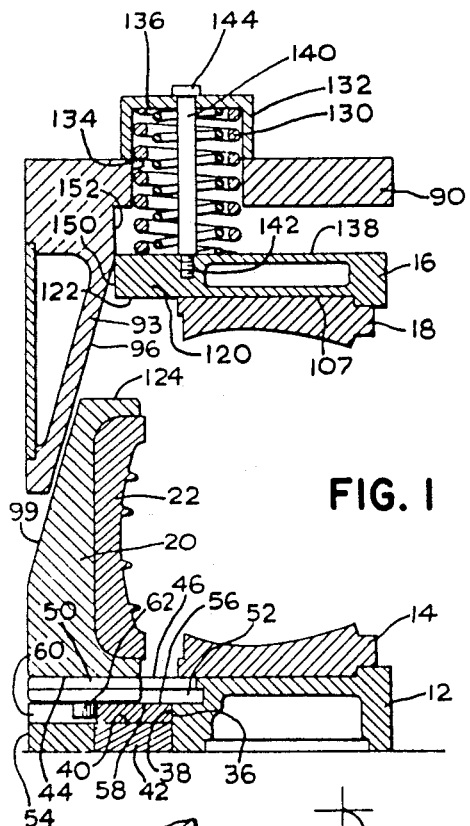
FIG. 1 is an elevation view of a half section of apparatus according to the invention with tire mold parts mounted therein, in partially open condition.
Figure 2:
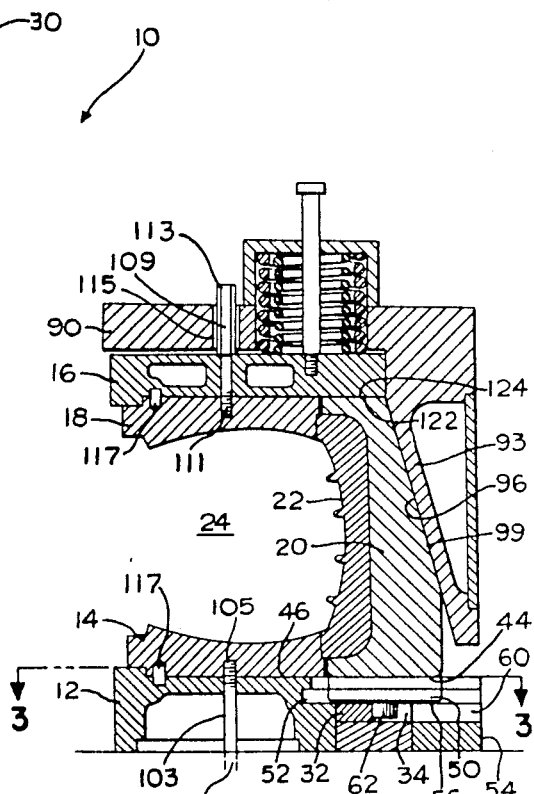
FIG. 2 is an elevation view of a half section, opposite in hand, of the apparatus of FIG. 1, shown in closed condition.

Referring to the drawings and particularly to FIGS. 1 and 2, a tire mold apparatus 10 in accordance with the invention comprises a lower platen 12 which provides means for detachably mounting a lower mold sidewall 14, an upper platen 16 which provides means for detachably mounting an upper mold sidewall 18, and a plurality of carrier segments 20 which provide means for detachably mounting tread molding segments 22 which are collectively cooperable with the mold sidewalls to form a tire molding cavity 24. The carrier segments 20 are mounted for radial movement relative to the lower platen 12 and to the molding cavity.

In order to move the carrier segments 20 radially outwardly of the axis 30 and away from the respective mold sidewalls, the apparatus incorporates camming means in the form of a cam ring 32 mounted for rotation coaxially of the lower platen 12 in an annular channel 34 formed in or associated with the lower platen. The inner circumference 36 of the ring 32 is guided by the cylindrical wall 38 formed in the platen and by the upper surface 40 of the support ring 42 fixed in the channel 34.

Each of the carrier segments 20 has a lower plane radial surface 44, perpendicular to the axis 30 of the mold, which is mounted slidably on the plane radial annular surface 46 of the platen 12 outwardly of the lower mold sidewall 14. A T-block 50 is securely attached to the lower surface 44 of each segment 20 to provide slide means cooperable with guide means in the form of a plurality of T-slots 52 formed in the lower platen 12 open to the surface 46 and extending radially inwardly from the periphery 54 of the platen, each T-slot accommodating respectively one of the T-blocks 50. The segments are also prevented by the T-block and T-slot cooperation from partaking of any significant movement axially with respect to the platen 12.

The bottom surface 56 of each of the T-slots 52 and the upper surface 58 of the channel 34 are essentially coplanar such that a passageway 60 opening downwardly from the surface 56 of each respective T-slot accommodates a cam follower 62 fixed securely to the T-block 50 and the segment carrier 20. Each passageway 60 extends radially outwardly from the cam ring 32. As may be seen in FIGS. 3 and 4, both the passageways 60 and the T-slots 52 extend continuously to the periphery of the platen so as to permit each respective segment carrier 20 and its cam follower 62 to be moved radially outwardly away from the cam ring 32 without interference and so be completely removed from the platen 12.

Figure 3:
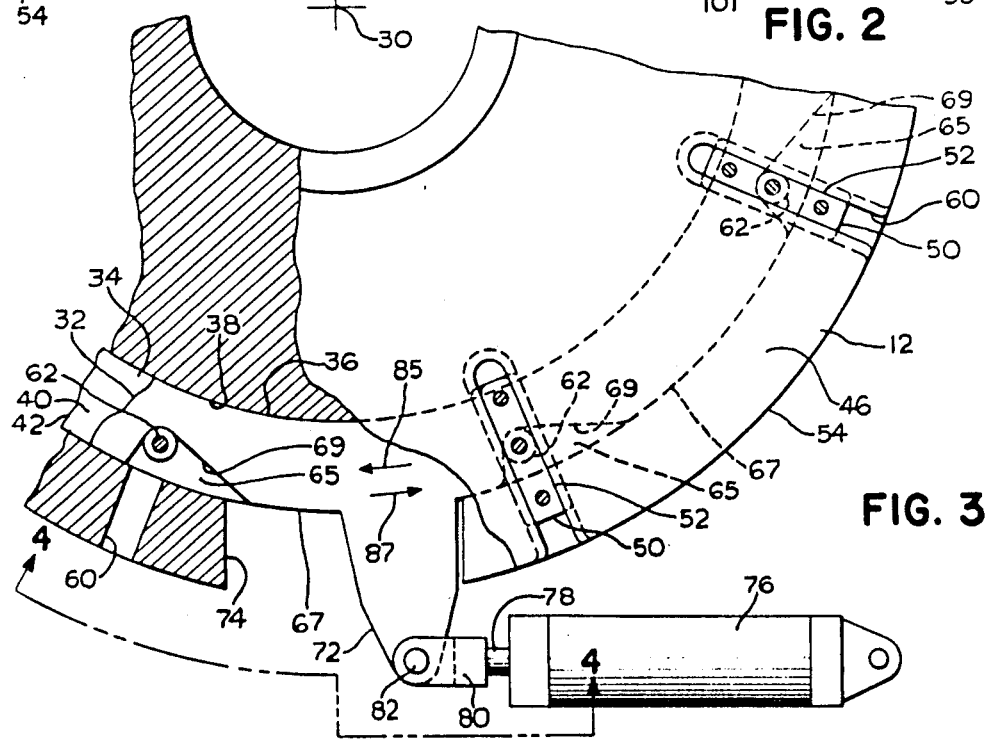
FIG. 3 is a partial plan view, oriented as indicated by lines 3—3 in FIG. 2, with parts removed and other parts broken away.

With reference to FIGS. 3 and 4; a plurality of notches 65 formed radially inwardly in the periphery 67 of and spaced about the cam ring 32 provide a plurality of cam ramps 69, best seen in FIG. 3, each ramp 69 being associated with a respective one of the cam followers 62. The slope of the cam ramps 69 can have any suitable angle and rise. In the tire mold apparatus 10 illustrated in the drawings, an angular movement of the ring 32 about the axis 30 of about 12° provides a rise of about 28 millimeters, effecting a radial displacement of each follower 62 sufficient positively to separate each of the tread mold segments 22 from a tire molded in the cavity 24. The cam ring 32, it will be observed, and the respective cam ramps 69 formed therein are disposed radially inwardly of the respective cam followers 62 such that contact between the follower and respective cam ramp is radially inward of the cam follower. Thus, the camming means is operable only to move the segment carriers 20 outwardly, away from the tire, and not for radially inward movement of the carriers.

In order to rotate the cam ring 32 about the mold axis 30 and relatively of the respective cam followers 62, an arm 72 secured to or integral with the cam ring extends radially outwardly therefrom through a window 74 formed in the platen 12 outwardly of the channel 34. A fluid-operated cylinder 76 is pin-connected at its head end to a stationary portion (not shown) of the apparatus. The rod 78 of the cylinder carries a clevis 80 which is pivotally attached to the arm 72 by a pin 82 such that as the piston rod 78 is extended from the cylinder 76 the cam ring 32 is caused to rotate in a direction (arrow 85) which forces the cam followers 62 and the respectively associated segment carriers 20 radially outwardly. Retraction of the piston rod 78 in the cylinder rotates the cam ring 32 in an opposite direction (arrow 87) without effect on the respective segment carriers 20 and merely returns the ring 32 to an angular position which allows the segment carriers 20 to be moved freely radially inwardly to close the tire molding cavity, and the respectively associated cam followers 62 to be moved freely into the notches 65. The camming means and the segment carriers are movable only in a radial plane with respect to the lower platen but do not move axially thereof as the upper platen is moved.

Referring again to FIGS. 1 and 2, the tire mold apparatus 10 in accordance with the invention includes a bolster 90 which is mounted for movement coaxially toward and away from the lower platen 12 and the segment carriers 20 thereon. The bolster can be attached to or be a part of otherwise conventional apparatus, not shown, by which the upper platen 16 can be moved coaxially toward and away from the lower platen 12 and the segment carriers 20.

In order to move the carrier segments 20 radially inwardly toward the mold axis 30 to place the tread molding segments 22 in circumferentially closed position, closing means in the form of an actuator ring 93 is mounted on or made integral with the bolster 90. The radially inner surface 96 of the segment actuator ring is frusto-conical in form and coaxial with the mold axis 30. It is free of grooves, keys and the like. Each segment 20 has a radially outward surface 99 forming an arcuate part of a frusto-cone which is engageable with the actuator ring surface 96, the two surfaces 96 and 99 cooperating to move the respective segment carriers 20 radially inwardly in response to coaxial movement of the bolster 90 and the actuator ring 93 toward the lower platen 12.

A plurality of bolts 101 spaced about the axis 30 are extended upwardly through clearance holes 103 in the lower platen 12 and threaded into holes 105 provided in the lower mold sidewall 14 to secure the latter removably to the lower platen 12. The sidewall 14 can be otherwise secured to the platen 12 or be there held by its own weight.

The upper mold sidewall 18 is detachably mounted upon an annular surface 107 of the upper platen 16 and there secured by a plurality of bolts 109 seated on the platen and threaded into holes 111 in the mold sidewall 18. The wrench heads 113 of the bolts are elongated and protrude through clearance openings 115 in the bolster 90 so as to provide for convenient interchange of individual upper mold sidewalls 18.

In order to provide for a fixed angular relation between the upper mold sidewall 18 and the lower mold sidewall 14, a dowel or locator pin 117 is fixed in each platen for engagement with a hole appropriately located in the respective mold sidewall.

The radially outer portion 120 of the upper platen 16 is provided with an annular plane radial surface 122 perpendicular to the axis 30 which engages plane radial upper surfaces 124 provided on the respective segments 20 and limits the coaxial movement of the upper platen 16 toward the lower platen 12. The surface 124 of each carrier 20 will slide radially on the surface 122 as the carriers are moved relatively toward the axis 30.

To move the upper platen 16 relatively coaxially of the bolster 90 and the lower platen 12, means including a plurality of compression spring sets 130 mounted in a plurality of bosses 132 are spaced equally about the axis 30 and secured to or made integral with the bolster 90. The spring sets each are housed in a cylinder 134 formed in the bolster 90 and in the boss 132, and extend compressibly between the seat 136 in the boss and the upper surface 138 of the upper platen 16 so as to urge the platen 16 away from the bolster 90. The platen 16 is connected to the bolster 90 for limited movement of the platen away from the bolster by a plurality of bolts 140 each extending parallel to the mold axis 30 through a respective boss and spring set therein, and screwed into a hole 142 in the platen 16. The bolt head 144 engages the boss 132 to arrest movement of the platen 16 away from the bolster 90. Advantages of the limited movement will be described in greater detail presently. The platen 16 is movable coaxially of the bolster 90. The outer surface 150 of the platen 16 engages the cylindrical surface 152 on the bolster 90 adjacent the actuator ring 93 to maintain a coaxial relation between the platen 16 and the bolster 90.

Referring briefly to FIG. 5; an alternative embodiment of the apparatus according to the invention provides means for moving the upper platen 16 coaxially relatively of the bolster 90 and the lower platen 12 in the form of a plurality of fluid pressure-operated cylinders, preferably double-acting cylinders 151 mounted fixedly upon the bolster 90. The piston rods 153 extend through openings in the bolster and are secured to the platen 16. Fluid pressure supplied from a conventional source and applied at the head ends of the cylinders moves the piston rods 153 and the platen 16 away from the bolster and toward the lower platen 12. Pressure applied at the rod end of the cylinder operates to retract the platen 16 toward the bolster 90.

The actuator ring 93, the bolster 90 with the upper platen 16, and mold sidewall 18, can be moved coaxially of and away from the segments 20 and the lower platen 12 by conventional apparatus (not shown) to provide unimpeded access for a tire to be placed on or removed from the mold sidewall 14.

Referring to FIGS. 5, 6, and 7; in a second embodiment of the invention, camming means is provided in the form of the cam ring 160 mounted for coaxial rotational movement in the channel 162. Means for moving the cam ring comprises a cam plate 164 disposed coaxially of the lower platen 121 beneath the cam ring 160 which it supports, and guided for rotational movement by the cylindrical wall 166 formed in the platen 121. Projecting radially outwardly from and secured to the cam plate 164 is a radial extension 168 to which is secured an upwardly extending parti-cylindrical plate 170 having a cam slot 172. A driving stud 174 projects radially from the actuator ring 93' at an angular location such that the stud 174 enters the open end 176 of the slot 172 as the actuating ring 93' descends. From the open end 176 the slot 172 follows a path which is a portion of a helix about the axis 30. With downward movement of the bolster 90 and actuating ring 93', the stud 174 moves in a path parallel to the axis 30 and engages the lower side 178 of the slot, thereby driving the cam plate 164 anti-clockwise in FIG. 6 and to the right in FIG. 7. A pawl 180 mounted pivotably on the extension 168 and biased in a clockwise direction (FIG. 6) by a torsion spring 182, is moved relatively to the cam ring 160 along the cam ramp 184 sufficiently past the end 186 to permit the pawl 180 to drop into the next notch 188. The cam ring 160 is prevented from being moved anti-clockwise by engagement of one radial face 190 with a cam follower 62, during anti-clockwise movement of the plate 164. As the bolster 90 and actuating ring 93' are moved upwardly, the stud 174 engages the upper side 192 of the slot, thus driving the plate 170 to the left as seen in FIG. 7, and clockwise as seen in FIG. 6. The pawl 180, being engaged with the radial face 190 drives the cam ring 160 clockwise. The cam ramps 184 then respectively being engaged with the cam followers 62 mounted respectively on the T-blocks 50 of the segments 20, move the latter radially outwardly separating the tread molding segments 22 from the tire. The motion of the cam plate 164 is sufficient to locate a next succeeding notch 188 in radial alignment with the associated cam follower 62 so that on the next cycle of the apparatus 10', the segments 20 and the respective cam followers 62 can be moved radially inwardly without contact or interference with the cam ring 160. In the embodiments here described with reference to FIGS. 5, 6, and 7, the cam ring 160 is advanced by one notch in each cycle of operation of the press.

Referring to FIGS. 8, 9, and 10; in a further modification according to the invention, the cam ring 200 is secured to or made a part of the cam drive plate 202 to which is secured an upwardly extending parti-cylindrical plate 204 having a cam slot 206 in the form of a partial helix coaxial with the axis 30. A stud 208 fixed on the actuating ring 93'' is aligned vertically with the open end 210 of the slot. As the bolster 90 and actuator ring 93'' are moved downwardly, the stud 208 engages the lower side 212 of the slot, moving the plate 204 to the right in FIG. 10 and anti-clockwise in FIG. 9.

In the embodiments illustrated in FIGS. 5–10; the slopes of the slots 172 and 206 are such that the cam ring is moved anti-clockwise while the actuator ring 93' or 93'' descends and moves the segments 20 and the cam followers 62 radially inwardly. The anti-clockwise movements in each of the cam rings 160 or 200 is timed relative to the descent of the actuator ring so that the cam followers 62 do not, during their inward movement, engage the respective cam ramps. As the actuator ring 93'' and bolster 90 are moved upwardly during opening of the press, the stud 208 engages the opposite or upper side 216 of the slot thereby moving the plate to the left as seen in FIG. 10 and clockwise as seen in FIG. 9. Each cam ramp 214 is thus engaged with an inwardly oriented part of the respective cam follower 62 for moving the respective segment carriers 20 radially outwardly. The location and helical angle of the sides of the slots are determined such that the radially outward movement of the segments 20 lags slightly to permit the actuator ring surface 96 to move and remain out of contact with the respective segment carriers as the press is opened.

Figure 11:
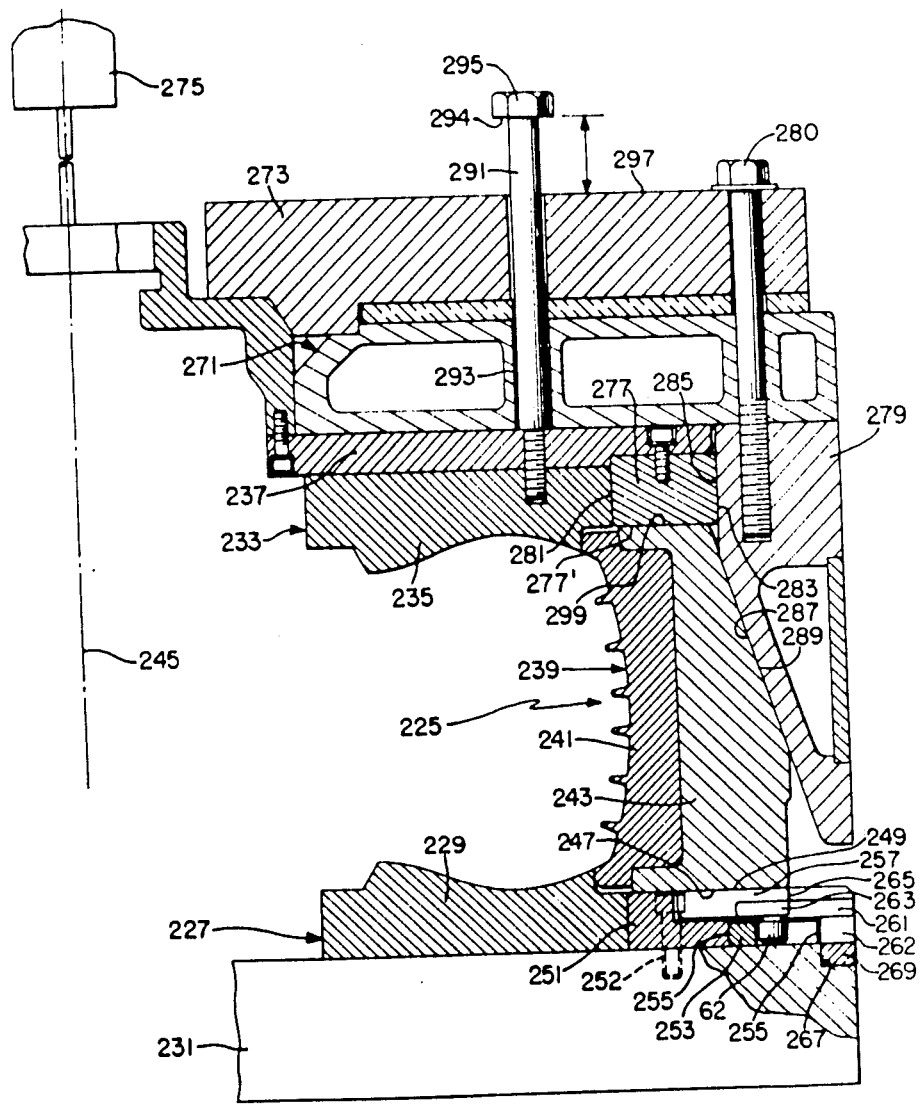
FIG. 11 is a partial elevation view in section embodying further features in accordance with the invention, the mold being shown in the fully closed position.
Figure 12:
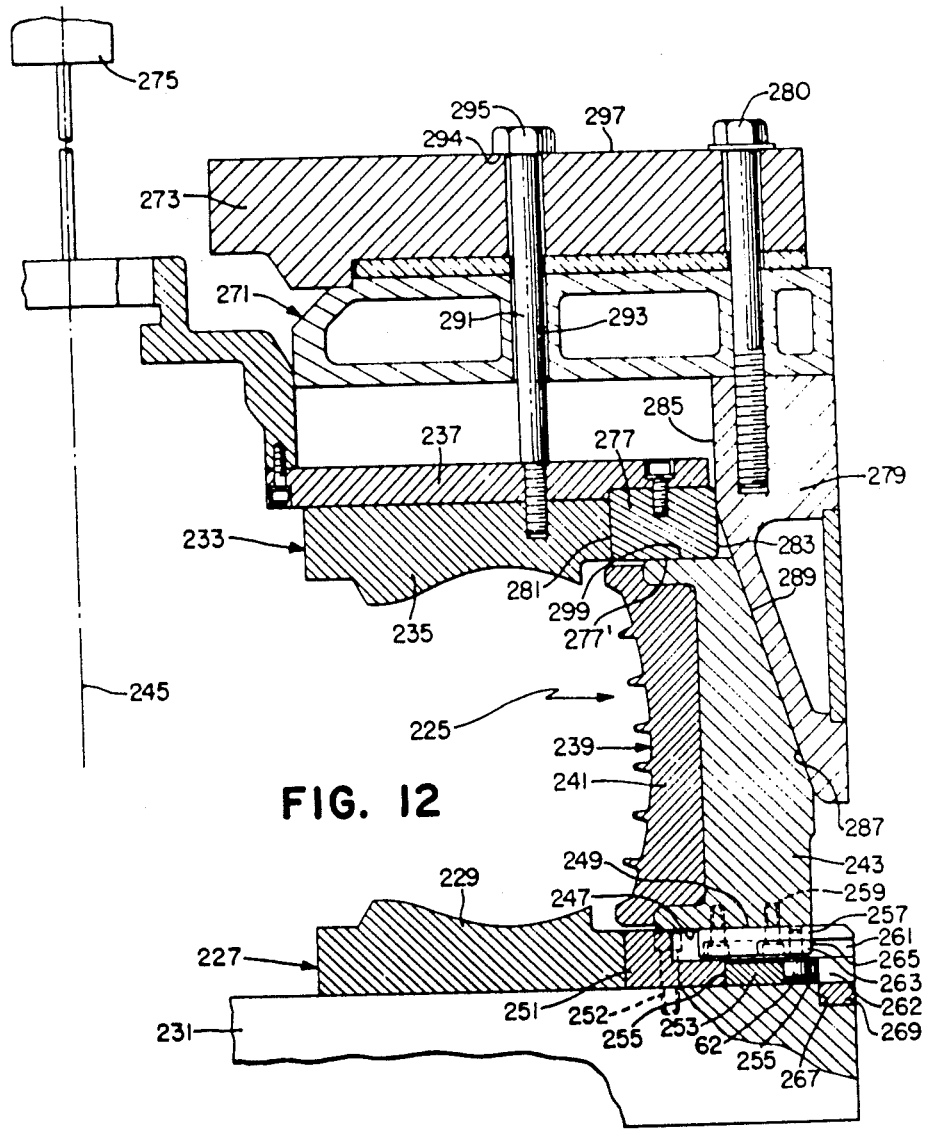
FIG. 12 is a partial elevation view of the apparatus and mold of FIG. 11, the mold being shown in a partially opened condition.
Figure 13:
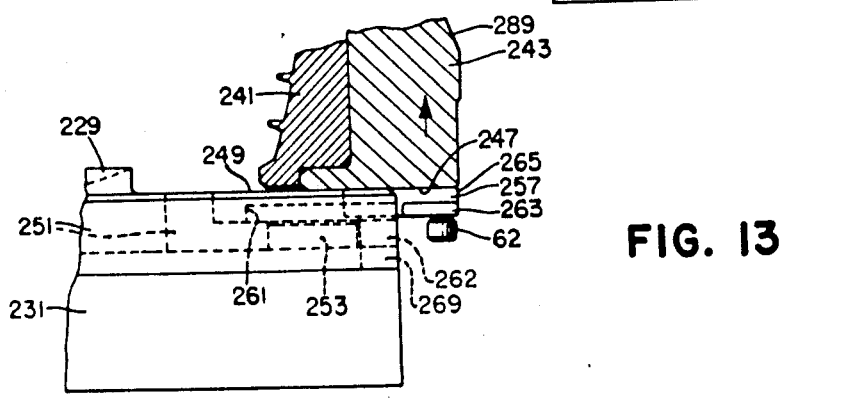
FIG. 13 is a view of a portion of the apparatus of FIGS. 11 and 12.

A further embodiment of the invention is illustrated in FIGS. 11, 12, and 13, to which the description now refers. The tire mold apparatus 225 comprises the first annular mold part 227 including the lower sidewall mold 229 placed on the lower platen 231, the second annular mold part 233 including the upper sidewall mold 235 carried by the axially movable upper platen 237, and a plurality of tread mold segments 239 which comprise the tread mold segments 241 and the carrier segments 243. Like the apparatus 10 illustrated in FIGS. 1 and 2, the carrier segments 243 provide means for detachably mounting the tread mold segments 241 which are collectively cooperable with the sidewall molds 229, 235 to form a tire molding cavity. The carrier segments 243 are mounted for radial movement toward and away from the mold axis 245. The lower plane surfaces 247 of the carrier segments are coplanar and slidable on the plane surface 249 of the cam housing ring 251 which is affixed by bolts 252 on the lower platen 231. The ring 251 is a unitary member formed of a metal dissimilar from the metal of the segments 243 which slide thereon to minimize both friction and wear which occur as a result of the relative sliding motion. By way of example, the ring 251 can be constructed of Ampco 18 bronze and the segments 243 of a low carbon cast steel.

To move the segments 243 radially outwardly away from a tire in the mold cavity, a cam ring 253, of the type described in connection with the embodiment 10 (see FIG. 3), is mounted for rotation about the mold axis 245 in the annular channel 255 formed in the cam housing ring 251 and can be operated by cylinder mechanism as illustrated in FIG. 3, or by the cam plate mechanisms illustrated in FIGS. 5, 6, and 7, or FIGS. 8, 9, and 10, in the manner previously described herein.

A T-slide block 257 is secured by the cap screws 259 to the bottom surface 247 of each segment and provides slide means which cooperate with guide means in the housing ring 251 in the form of T-slots 261 extending radially inwardly from the periphery of the housing ring, and having passageways 262 like the passageways 60 to accommodate the cam followers 62 previously described. The T-slots 261 are in all respects formed like the T-slots 52 in the apparatus 10 (best seen in FIG. 4). The slide blocks 257, however, differ from the T-blocks 50 in that the crossbar portion 263 of each T-slide block 257 disposed within the crossbar part of the T-slots, is limited in its radial width, that is, the dimension parallel to the respectively associated radius and direction of movement of the respective segment 243 and is located close to the radially outer extremity 265 of the slide block. This feature, as may be seen in FIG. 13, permits the segment to be removed easily from the T-slot, it being necessary to move the segment 241 radially outwardly beyond the periphery of the ring only sufficiently to equal the radial dimension of the crossbar portion 263 whereupon the segment carrier is completely disengaged and can be lifted as indicated by the arrow from surface 249. The mold apparatus can be placed closely adjacent to another mold in a conventional tire mold press. It will be apparent that this feature enables the use of a larger mold in an existing tire mold press.

As will be apparent to persons skilled in the art, the apparatus 225 has the advantage of requiring a relatively minor modification of the lower press platen 231, it being necessary only to provide an annular rabbet 267 to locate the depending flange 269 of the ring 251 concentrically of the mold axis. Moreover, the ring 251 can be removed from the platen 231 as a unit either to accommodate another similar housing ring suitably adapted to cooperate with a differing number, e.g. 5, 6, 7, 8, or 9, of segments in the mold assembly, or to use in the press a conventional two-part mold.

Turning to FIG. 12, the apparatus 225 includes the upper platen 237 to which the annular upper sidewall mold 235 is secured. The upper platen 237 and upper sidewall mold 235 are moved axially of the mold and relatively with respect to the press bolster 271 and bolster plate 273 by means of a conventional hydraulic cylinder 275 extending coaxially of the mold and connected to move the platen 237 in a manner presently to be described.

A bearer ring 277 affixed concentrically of the mold axis on the upper platen 237 is made preferably of a metal dissimilar from the metal of the segments 243 and of the closing ring 279. By way of example, the ring 277 can be of Ampco 18 bronze while the segments are of cast, low carbon steel and the closing ring of ductile or magnesium-treated iron. The radially inward surface 281 of the bearer ring serves to position the upper sidewall mold on the upper platen while the outward surface 283 cooperates with the radially inward surface 285 of the closing ring 279 to guide the axial movement of the upper platen 237 relatively of the bolster 271. Means for moving the segment carriers radially inwardly toward the axis is provided by the closing ring 179 mounted on the bolster plate 273 by bolts such as 280. The ring 279 has a frusto-conical inner surface 287 which cooperates with conforming conical surfaces 289 formed on each of the segments to move the latter radially inwardly in response to axially downward movement of the bolster and closing ring 279.

In accordance with a further aspect of the invention, the upper platen 237 is provided with positive stop means limiting the travel of the upper platen 237 with respect to the bolster 271 as the same is moved by the cylinder 275. The positive stop means in the apparatus 225 comprise a plurality of bolts 291 movable longitudinally in clearance holes 293 through the bolster and are secured rigidly to the platen 237 and the upper sidewall mold 235 in a circular array concentric and extending parallel with the mold axis. A flange 294 formed on each bolt head 295 engages the upper surface 297 of the bolster plate 273 so as to limit positively the movement of the upper sidewall mold 235 away from the bolster. The spacing between the flange 294 and the upper surface 297 is such as to limit the travel of the second or upper mold part with respect to the bolster to a fraction and preferably, although not necessarily, a minor fraction of the travel of the closing ring 279, during engagement of the latter with the segments. Sufficient fluid pressure is applied in the hydraulic cylinder to move the upper platen and sidewall part to a closed position while overcoming the tendency of the pressure of the heating and molding fluid within the tire cavity to displace the tire sidewall axially. However, by limiting the travel of the upper sidewall mold part toward the tire, the segments are engaged by the closing ring 279 to at least initiate their radial inward movement before a significant axial load is applied by the bearer ring to the segment carriers. The bearer ring surface 277' engages the surfaces 299 of the segments after their inward movement is begun by the closing ring and remains in such contact until the upper mold part is raised to engage the bolster surface with the bolt flanges 294. The axial loading on the segments, and the consequent friction and wear of the sliding surfaces is less than experienced in the art heretofore.

Except as described herein, the apparatus 225 can be like apparatus 10 as to both structure and operation.

A tire mold apparatus in accordance with the invention provides a particular advantage in that the cost of molds can be considerably reduced relative to the cost of the usual segmented mold. The three-part mold itself, which comprises only two unitary annular mold sidewalls and a set of tread mold segments, is readily interchanged in the tire mold apparatus without affecting the parts or the operations of the apparatus. Thus, changes in styles and sizes of tires to be molded are readily accomplished at relatively low cost. It will be observed also that the individual segment carriers are not required to have their adjacent arcuate ends in contact when the mold is closed, thus the individual segment segment carriers can, if desired, be made from a single ring.

A further advantage results from the fact that the cooperating conical surfaces of the actuating ring and the respective segment carriers can easily be generated to very accurate form and that the respective sliding surfaces of the segment carriers in contact with the surfaces of the upper and lower platens are also plane readily generated surfaces, thus greatly simplifying the manufacture of the tire mold press.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for molding a tire comprising a first annular sidewall mold part, a second annular sidewall mold part movable coaxially of the mold axis relatively of said first part, a plurality of tread mold segments mounted on said first sidewall mold part, and closing means connected to and axially movable relatively of said second part and engageable with means carried by said segments to move the segments only radially inwardly in response to said axial movement of said closing means, said segments being mounted for limited inward and for free and unlimited radiallY outward movement and removal from said first sidewall mold part in a plane parallel to said first part sidewall mold, and tread segment opening means engageable with said segments and mounted independently of and apart from said closing means for rotation in a plane normal to said axis and in non-interfering relation with the removal of said segments.

2. Apparatus as claimed in claim 1, wherein said opening means comprises camming means engageable with follower means fixed with respect to each said tread mold segment and movable relatively of said follower means to effect radially outward movement of said segments.

3. Apparatus according to claim 2, said camming means comprising a cam ring mounted inwardly of said follower means for rotation coaxially of the said first mold part, said ring having a plurality of cam ramps each associated respectively with one of said follower means and engageable with the latter to move said segments only outwardly.

4. Apparatus as claimed in claim 2, including means for actuating said camming means.

5. Apparatus as claimed in claim 4, said means for actuating said camming means comprising a fluid cylinder operable to effect partial rotation of said camming means.

6. Apparatus as claimed in claim 4, said means for actuating said camming means comprising a stud mounted fixedly relative to one of said second part and said camming means, a cam plate having a helical slot mounted fixedly with respect to the other of said second part and said camming means, said stud being engageable in said slot and movable therein response to movement of said second part coaxially of said first part to effect rotary movement of said camming means.

7. Apparatus as claimed in claim 4, comprising a cam drive plate mounted coaxially and rotatably relative to said cam ring, a spring-biased pawl pivotally mounted on said cam drive plate, said cam ring having a plurality of notches successively engageable with said pawl to effect corotation of said cam ring and said cam plate in a first rotational sense, said pawl being disengageable from said cam ring during rotational movement of said cam drive plate in the opposite rotational sense, and said actuating means including means for effecting rotation of said cam drive plate in response to coaxial relative movement between the first and second parts of said mold.

8. Apparatus as claimed in claim 1, said first annular mold part including a changeable upper sidewall mold, said second annular mold part including a changeable lower sidewall mold, the pair of sidewall molds being disposed coaxially along a common axis, support means for supporting the lower sidewall mold with said axis extending vertically, means mounting the upper sidewall mold for movement toward and away from the lower sidewall mold, the plurality of said tread mold segments being arranged about said common axis, mounting means carried by said support means for mounting said tread segments interchangeably and for movement radially of said axis, said closing means being movable in the direction of said axis and engageable with means movable with said tread mold segments to move said segments toward said axis in response to downward movement of said closing means, and said opening means including camming means carried by said support means for rotation about said axis and engageable with cam follower means movable with said segments to move said segments radially only outwardly of said axis, said mounting means permitting unlimited movement of said segments radially outwardly of said axis.

9. Apparatus as claimed in claim 1, comprising bolster means cooperatively associated with said second mold part to effect movement thereof coaxially toWard and away from the first mold part.

10. Apparatus as claimed in claim 9, said closing means being mounted on said bolster means and cooperatively engageable with means on said tread mold segments to move the same radially only inwardly.

11. Apparatus as claimed in claim 1, comprising guide means associated with said first part and extending radially outwardly therein, and slide means secured one on each of said tread mold segments to slide in said guide means, said guide means being open at the radially outward ends thereof to permit free removal therefrom of said tread mold segments, said guide means and said slide means cooperating to prevent any significant movement of the tread mold segments axially with respect to the first mold part.

12. Apparatus as claimed in claim 11, said guide means comprising a plurality of T-slots extending radially inwardly from the periphery of said first part, said slide means comprising a slide block affixed one each on said segments and slidable in said respective T-slots, each said slide block having a crossbar portion slidable in the respective T-slot to limit relative movement between said segment and said first part in the axial direction, said crossbar portion extending radially inwardly of the outward end of the respective slide block a minor fraction of the length of said slide block, whereby each said segment is released from said T-slot for upward movement away from the first mold part after radial movement outwardly beyond the normal operating travel thereof.

13. Apparatus in accordance with claim 11, said guide means comprising a plurality of T-slots each associated with a respective one of said thread mold segments, and said slide means comprising a plurality of T-blocks each secured on one of said tread mold segments.

14. Apparatus as claimed in claim 13, said opening means including a cam follower mounted on each of said T-blocks, and camming means having a plurality of cam ramps each disposed radially inwardly of and engageable with a respective one cam follower.

15. Apparatus in accordance with claim 13, comprising means defining an annular channel disposed coaxially of said first part, means defining an opening between said channel and each of said T-slots, said opening means comprising camming means including a cam ring mounted in said channel for rotation coaxially of said first part, said cam ring having a plurality of cam ramps, a cam follower mounted on each of said tread mold segments and extending through said opening, each said cam follower being cooperable with the respective one of said cam ramps to move the respectively associated tread mold segment radially outwardly with respect to said cam ring in response to a rotational movement of said cam ring.

16. Apparatus as claimed in claim 15, said closing means comprising a closing ring having a frusto-conical inward surface cooperable with conforming outward surfaces of said tread mold segments.

17. Apparatus as claimed in claim 16, said first annular mold part comprising a lower sidewall mold oriented upwardly to receive a tire thereon, said closing means comprising a closing ring freely separable from said tread mold segments during axial upward movement of said closing ring and said second mold part away from said first mold part.

18. Apparatus as claimed in claim 1, further comprising control means to delay engagement of said second mold part with respect to said segments during closing of the mold until said closing means engages said means on said segments to initiate radially inward movement thereof.

19. Apparatus as claimed in claim 18, said control means comprising positive stop means for limiting the relative movement of said second part with respect to said closing means.

20. Apparatus as claimed in claim 19, said positive stop means comprising a plurality of bolts, a press bolster mounting said closing means for movement axially of said mold, said bolts being rigidly affixed to said second part in spaced circular array concentric with said axis and extending parallel thereto, and flange means on said bolts engageable with means carried by said bolster to limit positively the movement of said first part away from said bolster.

21. Apparatus as claimed in claim 1, said opening means comprising an integral annular cam housing ring, means for mounting said cam housing ring on a conventional press bottom platen, said ring being composed of a metal differing from the metal of said segments.

22. Apparatus as claimed in claim 21, said cam housing ring having means thereon for locating said first mold part concentrically with said axis.

23. Apparatus as claimed in claim 22, said housing ring comprising means defining an annular channel disposed coaxially of said first part, a plurality of T-slots each extending radially inwardly of the periphery of said first part and aligned respectively with said segments, means defining an opening between said channel and each of said T-slots, said opening means further comprising camming means including a cam ring mounted in said channel for rotation coaxially of said first part, said cam ring having a plurality of cam ramps, a cam follower mounted on each of said tread mold segments to extend through said opening, each said cam follower being cooperable with the respective one of said cam ramps to move the respectively associated tread mold segment radially outwardly with respect to said cam ring in response to a rotational movement of said cam ring.

24. Apparatus as claimed in claim 21, said cam housing ring having register means cooperable with means on a press lower platen to register said housing ring coaxially of the mold axis.

25. Apparatus as claimed in claim 24, said register means comprising an annular flange cooperable with an annular rabbet formed on said platen.

* * * * *